(12) United States Patent
Chu Ke

(10) Patent No.: US 8,218,866 B2
(45) Date of Patent: Jul. 10, 2012

(54) SATURATION ADJUSTMENT METHOD AND RELATED COLOR ADJUSTMENT SYSTEM

(75) Inventor: Hui Chu Ke, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 1086 days.

(21) Appl. No.: 12/124,126

(22) Filed: May 20, 2008

(65) Prior Publication Data

US 2009/0252410 A1  Oct. 8, 2009

(30) Foreign Application Priority Data

Apr. 2, 2008 (TW) ............................... 97111997 A (51) Int. Cl.
*G06K 9/00* (2006.01)

(52) U.S. Cl. ........................................ 382/167; 382/274

(58) Field of Classification Search .................. 382/162, 382/167, 274; 358/520; 345/593, 594
See application file for complete search history.

(56) References Cited

U.S. PATENT DOCUMENTS

| | | | |
|---|---|---|---|
| 5,093,717 A | 3/1992 | Sandrew | |
| 6,337,692 B1 | 1/2002 | Rai | |
| 6,453,067 B1 * | 9/2002 | Morgan et al. | 382/162 |
| 7,215,813 B2 * | 5/2007 | Graves et al. | 382/167 |
| 7,224,833 B2 | 5/2007 | Johannesson et al. | |
| 7,583,838 B2 * | 9/2009 | Lee | 382/167 |
| 7,623,266 B2 * | 11/2009 | Sloan | 358/1.9 |
| 2005/0012943 A1 | 1/2005 | Yao | |
| 2005/0149369 A1 | 7/2005 | Sevdermish | |
| 2007/0085856 A1 | 4/2007 | Wang et al. | |

OTHER PUBLICATIONS

Notice of Allowance mailed on Jul. 13, 2011 for the Taiwan application No. 097111997, filing date Apr. 2, 2008, p. 1-3 (Translation).

* cited by examiner

*Primary Examiner* — Phuoc Tran
(74) *Attorney, Agent, or Firm* — Winston Hsu; Scott Margo (57) ABSTRACT

A saturation adjustment method is disclosed for compensating over-saturation adjustment. The saturation adjustment method includes: adjusting a first full-scale saturation corresponding to a hue of a color wheel to become a second full-scale saturation wherein the second full-scale saturation is greater than the first full-scale saturation; setting a critical saturation corresponding to the hue based on the first and second full-scale saturations; and adjusting a first saturation within a range between the critical and second full-scale saturations corresponding to the hue to become a second saturation based on the first full-scale, second full-scale and critical saturations. Furthermore, disclosed is a color adjustment system essentially including a saturation adjuster for adjusting the first saturation greater than the critical full-scale saturation to become the second saturation based on an adjusted full-scale saturation and the critical saturation.

20 Claims, 7 Drawing Sheets

SATURATION ADJUSTMENT METHOD AND RELATED COLOR ADJUSTMENT SYSTEM

BACKGROUND OF THE INVENTION

1. Field of the Invention

The present invention relates to a saturation adjustment method and related color adjustment system, and more particularly, to a saturation adjustment method and related color adjustment system for compensating over-saturation adjustment.

2. Description of the Prior Art

In general, manufacturers of displays provide display products with functionality of OSD (On-Screen Display) adjustment for allowing users to adjust hue, saturation and brightness of image color. That is, users are allowed to adjust the image color of displays in a preset range by making use of the OSD adjustment. For instance, the user may adjust the original hue of red color to approach purple color, adjust the original low saturation to become higher saturation, or adjust the original high brightness to become lower brightness.

Figure 1:
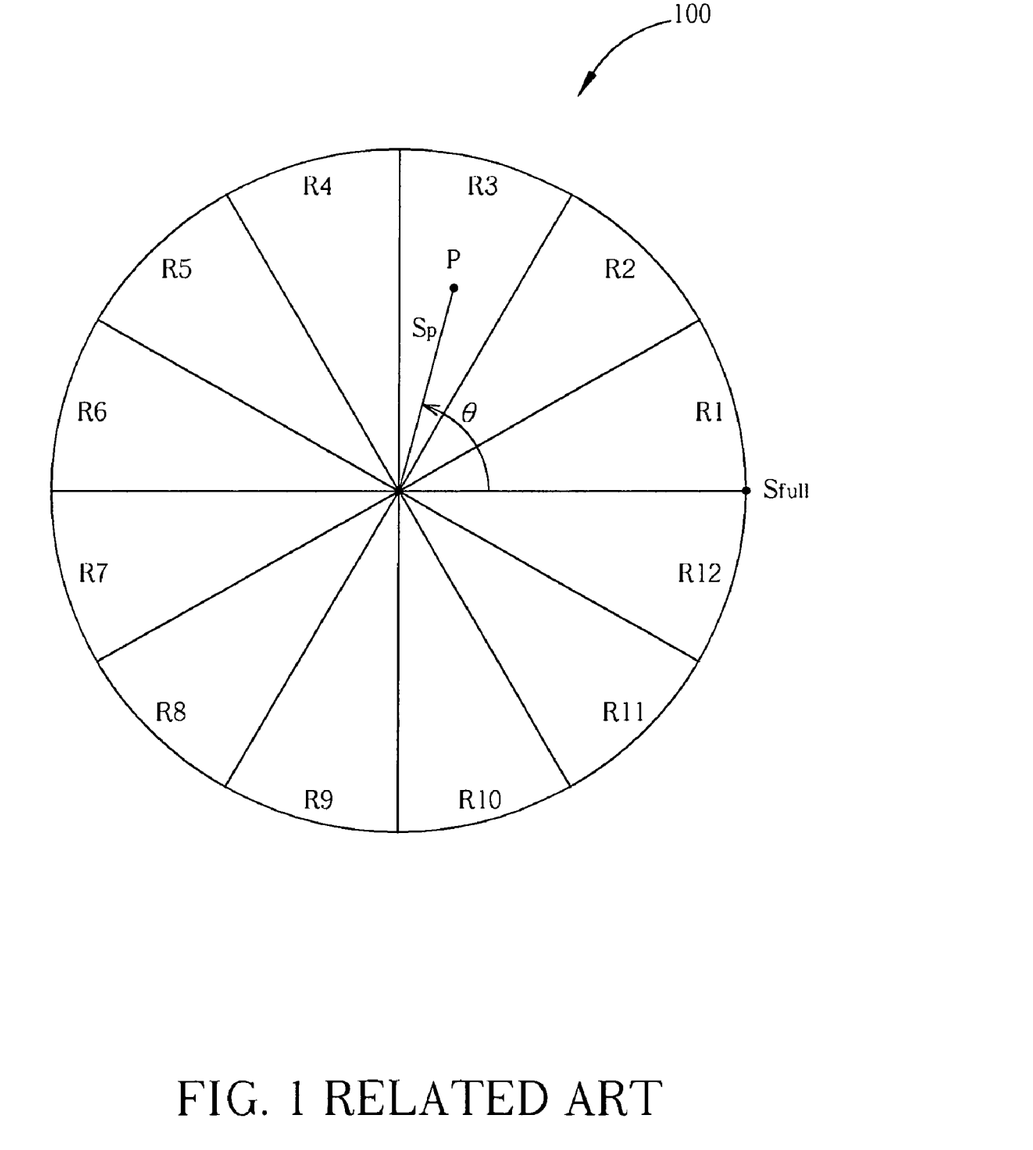
FIG. 1 is a schematic diagram showing a well-known color wheel.

FIG. 1 is a schematic diagram showing a well-known color wheel 100. As shown in FIG. 1, the color wheel 100 is normally sectioned into a plurality of hue regions R1-R12. The peripheral radius of the color wheel 100 is utilized to represent a preset full-scale saturation $S_{full}$. The hue of a color coordinate P is represented by a corresponding hue angle θ, and the saturation of the color coordinate P is presented by a corresponding radius Sp. Traditionally, the method for adjusting the saturation of a color coordinate corresponding to an interested hue comprises adjusting the full-scale saturation corresponding to the hue edge of a hue region including the interested hue, adjusting the full-scale saturation corresponding to the interested hue based on the adjusted full-scale saturation corresponding to the hue edge, and adjusting the saturation of the color coordinate based on the adjusted full-scale saturation corresponding to the interested hue.

Figure 2:
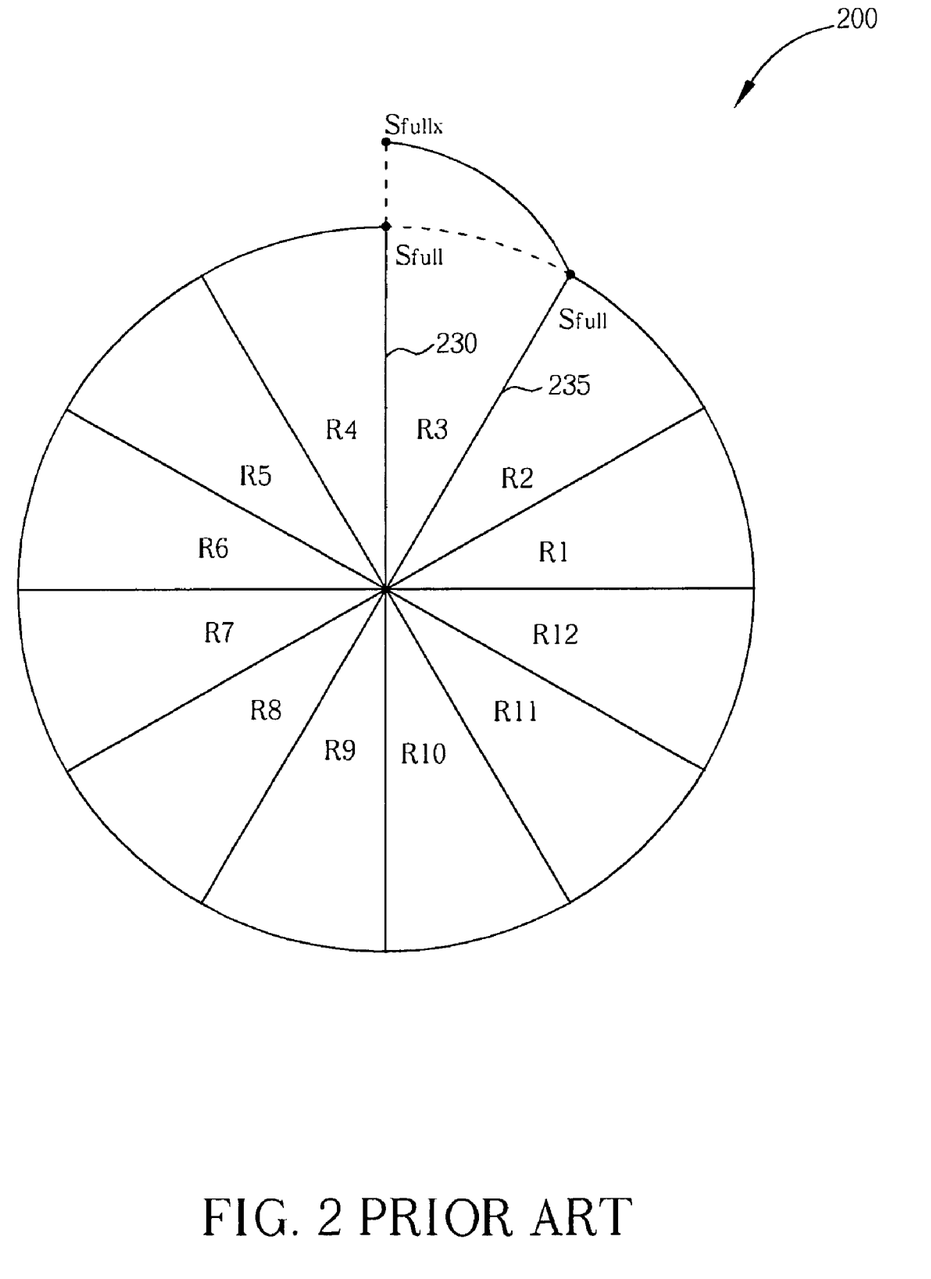
FIG. 2 is a schematic diagram showing a color wheel having over-saturation adjustment.

FIG. 2 is a schematic diagram showing a color wheel having over-saturation adjustment. As shown in FIG. 2, the preset full-scale saturation $S_{full}$ corresponding to the hue edge 230 of the hue region R3 of the color wheel 200 is adjusted to become the full-scale saturation $S_{fullx}$ greater than the preset full-scale saturation $S_{full}$, which implies an over-saturation adjustment situation. Accordingly, the full-scale saturations corresponding to the hue region R3 between the hue edge 230 and the hue edge 235 are adjusted based on the full-scale saturation $S_{fullx}$ and the preset full-scale saturation $S_{full}$. In the processes of the prior-art saturation adjustment method, the saturation of a color coordinate greater than the preset full-scale saturation $S_{full}$ is adjusted to become the preset full-scale saturation $S_{full}$. However, based on the prior-art saturation adjustment method, the saturations over the preset full-scale saturation $S_{full}$ are all set to become the preset full-scale saturation $S_{full}$ and cannot be distinguished between each other. That is, the saturation levels between the preset full-scale saturation $S_{full}$ and the full-scale saturation $S_{fullx}$ are sacrificed and are not available for distinction after the prior-art saturation adjustment. Furthermore, the saturation adjusting processes at opposite sides of the hue edge 230 between the hue regions R3 and R4 are based on different processing modes, and an abrupt change of saturation adjusting processes may significantly redistribute the original color profile and distort the original image feature. In summary, the prior-art saturation adjustment method is likely to cause image color distortion and degrade the display quality.

SUMMARY OF THE INVENTION

In accordance with an embodiment of the present invention, a saturation adjustment method for diminishing the image color distortion caused by the over-saturation adjustment is disclosed. The saturation adjustment method comprises: sectioning a color wheel into a plurality of hue regions, each hue region having a corresponding preset full-scale saturation; adjusting the preset full-scale saturation corresponding to a first hue edge of a first hue region of the hue regions to become a first full-scale saturation, wherein the first full-scale saturation is greater than the preset full-scale saturation; setting a first critical saturation corresponding to the first hue edge of the first hue region based on the first full-scale saturation and the preset full-scale saturation; and adjusting a first saturation within a range between the first critical saturation and the first full-scale saturation corresponding to the first hue edge of the first hue region based on the preset full-scale saturation, the first full-scale saturation and the first critical saturation.

In accordance with another embodiment of the present invention, a saturation adjustment method for diminishing the image color distortion caused by the over-saturation adjustment is disclosed. The saturation adjustment method comprises: adjusting a default full-scale saturation corresponding to a hue of a color wheel to become a regulated full-scale saturation, wherein the regulated full-scale saturation is greater than the default full-scale saturation; setting a critical saturation corresponding to the hue based on the default full-scale saturation and the regulated full-scale saturation; and adjusting an input saturation within a range between the critical saturation and the regulated full-scale saturation corresponding to the hue to become an output saturation based on the default full-scale saturation, the regulated full-scale saturation and the critical saturation.

Furthermore, the present invention provides a color adjustment system comprising a first color coordinate system converter, a color coordinate adjustment processor, a saturation adjuster, and a second color coordinate system converter. The first color coordinate system converter converts a first red signal, a first green signal and a first blue signal into a first hue signal, a first saturation signal and a luminance signal. The color coordinate adjustment processor is coupled to the first color coordinate system converter for receiving the first hue signal and the first saturation signal. The color coordinate adjustment processor stores a look-up table (LUT) for mapping the first hue signal and the first saturation signal to a corresponding hue region of a plurality of hue regions in a sectioned color wheel for generating a second hue signal and a second saturation signal. Moreover, the color coordinate adjustment processor is capable of adjusting a plurality of full-scale saturations corresponding to a plurality of hue edges of the hue regions of the sectioned color wheel. The saturation adjuster is coupled to the color coordinate adjustment processor for receiving the second saturation signal. The saturation adjuster adjusts the second saturation signal to become a third saturation signal based on at least one full-scale saturation and a critical saturation. The second color coordinate system converter is coupled to the first color coordinate system converter, the color coordinate adjustment processor and the saturation adjuster for receiving the luminance signal, the second hue signal and the third saturation signal respectively. The second color coordinate system converter converts the luminance signal, the second hue signal and the third saturation signal into a second red signal, a second green signal and a second blue signal.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto. Furthermore, the step serial numbers concerning the saturation adjustment method are not meant thereto limit the operating sequence, and any rearrangement of the operating sequence for achieving same functionality is still within the spirit and scope of the invention.

Figure 3:
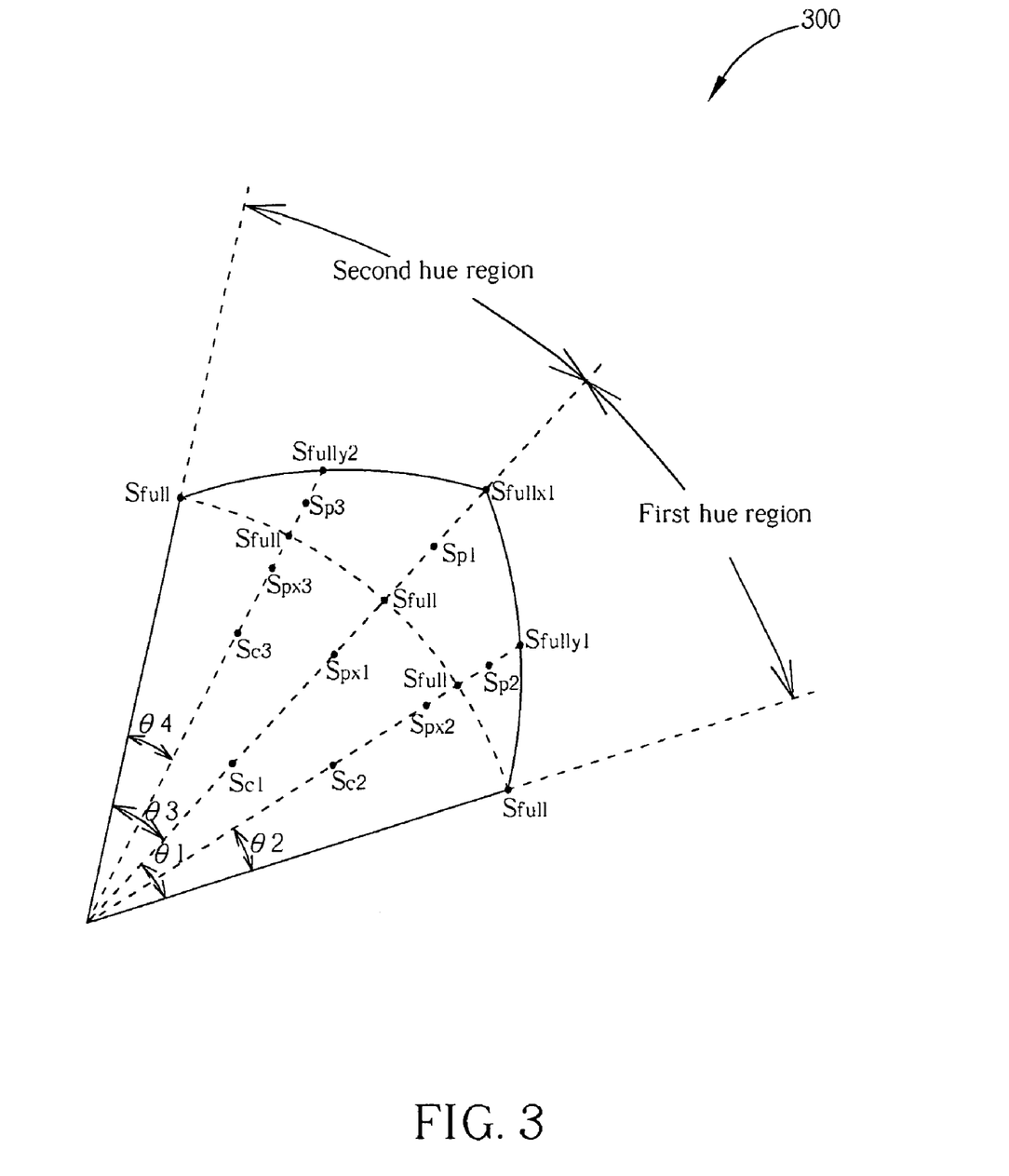
FIG. 3 is a schematic diagram showing parts of a color wheel having over-saturation adjustment on single hue edge of a hue region according to the present invention.
Figure 4:
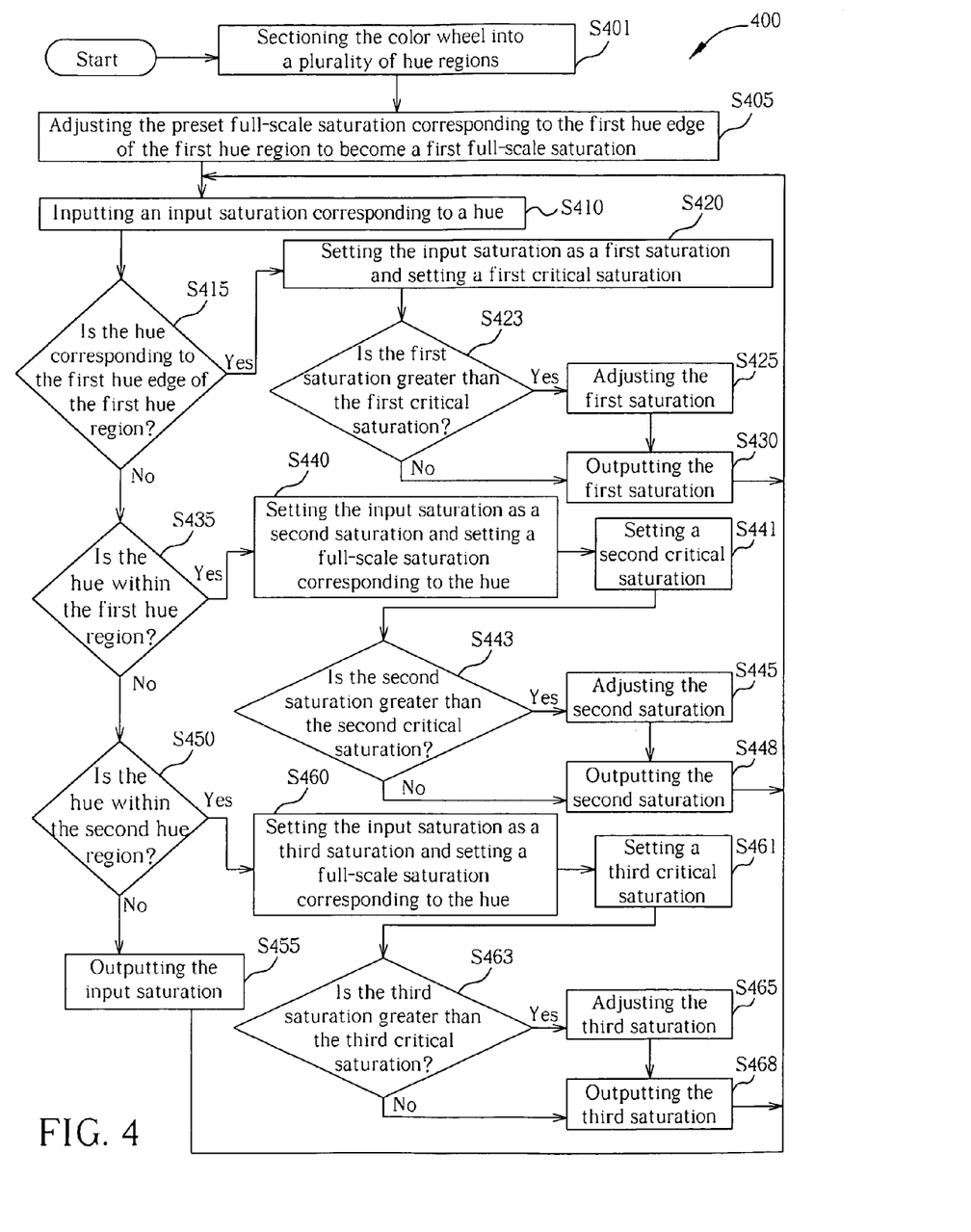
FIG. 4 is a flowchart depicting a saturation adjustment method in accordance with a first embodiment of the present invention.

FIG. 3 is a schematic diagram showing parts of a color wheel 300 having over-saturation adjustment on single hue edge of a hue region according to the present invention. For the sake of clarity, FIG. 3 illustrates only the first hue region and the second hue region of the color wheel 300. Please refer to FIG. 4 in conjunction with the color wheel 300 shown in FIG. 3. FIG. 4 is a flowchart depicting a saturation adjustment method 400 in accordance with a first embodiment of the present invention. The saturation adjustment method 400 comprises the following steps:

Step S401: sectioning the color wheel 300 into a plurality of hue regions comprising the first and second hue regions, each hue region having a corresponding preset full-scale saturation $S_{full}$;

Step S405: adjusting the preset full-scale saturation $S_{full}$ corresponding to the first hue edge of the first hue region to become a first full-scale saturation $S_{fullx1}$, wherein the first full-scale saturation $S_{fullx1}$ is greater than the preset full-scale saturation $S_{full}$;

Step S410: inputting an input saturation corresponding to a hue;

Step S415: determining whether the hue is corresponding to the first hue edge of the first hue region, if the hue is corresponding to the first hue edge of the first hue region, then go to step S420, otherwise go to step S435;

Step S420: setting the input saturation as a first saturation $S_{p1}$, and setting a first critical saturation $S_{c1}$ based on the first full-scale saturation $S_{fullx1}$ according to the formula (1) or (2) listed below:

$$S_{c1} = \frac{S_{full}^2}{S_{fullx1}} \alpha \qquad \text{Formula (1)}$$

$$S_{c1} = S_{full} - \frac{S_{full}^2}{S_{fullx1}} \alpha \qquad \text{Formula (2)}$$

where α represents a weighted value, the weighted value α is a real number greater than zero;

Step S423: determining whether the first saturation $S_{p1}$ is greater than the first critical saturation $S_{c1}$, if the first saturation $S_{p1}$ is greater than the first critical saturation $S_{c1}$, then go to step S425, otherwise go to step S430;

Step S425: adjusting the first saturation $S_{p1}$ according to the formula (3) listed below:

$$S_{px1} = S_{c1} + (S_{full} - S_{c1})\frac{S_{p1} - S_{c1}}{S_{fullx1} - S_{c1}} \qquad \text{Formula (3)}$$

where $S_{px1}$ represents the adjusted first saturation;

Step S430: outputting the first saturation as an output saturation corresponding to the input saturation, go to step S410;

Step S435: determining whether the hue is within the first hue region, if the hue is within the first hue region, then go to step S440, otherwise go to step S450;

Step S440: setting the input saturation as a second saturation $S_{p2}$, and setting a full-scale saturation $S_{fully1}$ corresponding to the hue based on the first full-scale saturation $S_{fullx1}$ according to the formula (4) listed below:

$$S_{fully1} = S_{full} + \frac{\theta 2}{\theta 1}(S_{fullx1} - S_{full}) \qquad \text{Formula (4)}$$

where θ1 represents the hue angle included between the first and second hue edges of the first hue region, θ2 represents the hue angle included between the hue and the second hue edge of the first hue region;

Step S441: setting a second critical saturation $S_{c2}$ based on the full-scale saturation $S_{fully1}$ according to the formula (5) or (6) listed below:

$$S_{c2} = \frac{S_{full}^2}{S_{fully1}} \alpha \qquad \text{Formula (5)}$$

$$S_{c2} = S_{full} - \frac{S_{full}^2}{S_{fully1}} \alpha; \qquad \text{Formula (6)}$$

Step S443: determining whether the second saturation $S_{p2}$ is greater than the second critical saturation $S_{c2}$, if the second saturation $S_{p2}$ is greater than the second critical saturation $S_{c2}$, then go to step S445, otherwise go to step S448;

Step S445: adjusting the second saturation $S_{p2}$ according to the formula (7) listed below:

$$S_{px2} = S_{c2} + (S_{full} - S_{c2})\frac{S_{p2} - S_{c2}}{S_{fully1} - S_{c2}} \qquad \text{Formula (7)}$$

where $S_{px2}$ represents the adjusted second saturation;

Step S448: outputting the second saturation as an output saturation corresponding to the input saturation, go to step S410;

Step S450: determining whether the hue is within the second hue region adjacent to the first hue edge of the first hue region, if the hue is within the second hue region, then go to step S460, otherwise go to step S455;

Step S455: outputting the input saturation as an output saturation, go to step S410;

Step S460: setting the input saturation as a third saturation $S_{p3}$, and setting a full-scale saturation $S_{fully2}$ corresponding to the hue based on the first full-scale saturation $S_{fullx1}$ according to the formula (8) listed below:

$$S_{fully2} = S_{full} + \frac{\theta 4}{\theta 3}(S_{fullx1} - S_{full}) \quad \text{Formula (8)}$$

where $\theta 3$ represents the hue angle included between the first and second hue edges of the second hue region, $\theta 4$ represents the hue angle included between the hue and the second hue edge of the second hue region, the first hue edge of the second hue region is substantially corresponding to the first hue edge of the first hue region;

Step S461: setting a third critical saturation $S_{c3}$ based on the full-scale saturation $S_{fully2}$ according to the formula (9) or (10) listed below:

$$S_{c3} = \frac{S_{full}^2}{S_{fully2}}\alpha \quad \text{Formula (9)}$$

$$S_{c3} = S_{full} - \frac{S_{full}^2}{S_{fully2}}\alpha; \quad \text{Formula (10)}$$

Step S463: determining whether the third saturation $S_{p3}$ is greater than the third critical saturation $S_{c3}$, if the third saturation $S_{p3}$ is greater than the third critical saturation $S_{c3}$, then go to step S465, otherwise go to step S468;

Step S465: adjusting the third saturation $S_{p3}$ according to the formula (11) listed below:

$$S_{px3} = S_{c3} + (S_{full} - S_{c3})\frac{S_{p3} - S_{c3}}{S_{fully2} - S_{c3}} \quad \text{Formula (11)}$$

where $S_{px3}$ represents the adjusted third saturation;

Step S468: outputting the third saturation as an output saturation corresponding to the input saturation, go to step S410.

In the flow of the saturation adjustment method 400, if the process of step S423 determines that the first saturation $S_{p1}$ is not greater than the first critical saturation $S_{c1}$, then the process of step S430 outputs the unadjusted first saturation $S_{p1}$ as the output saturation corresponding to the input saturation, otherwise the process of step S430 outputs the adjusted first saturation $S_{px1}$ as the output saturation corresponding to the input saturation.

If the process of step S443 determines that the second saturation $S_{p2}$ is not greater than the second critical saturation $S_{c2}$, then the process of step S448 outputs the unadjusted second saturation $S_{p2}$ as the output saturation corresponding to the input saturation, otherwise the process of step S448 outputs the adjusted second saturation $S_{px2}$ as the output saturation corresponding to the input saturation.

If the process of step S463 determines that the third saturation $S_{p3}$ is not greater than the third critical saturation $S_{c3}$, then the process of step S468 outputs the unadjusted third saturation $S_{p3}$ as the output saturation corresponding to the input saturation, otherwise the process of step S468 outputs the adjusted third saturation $S_{px3}$ as the output saturation corresponding to the input saturation.

Figure 5:
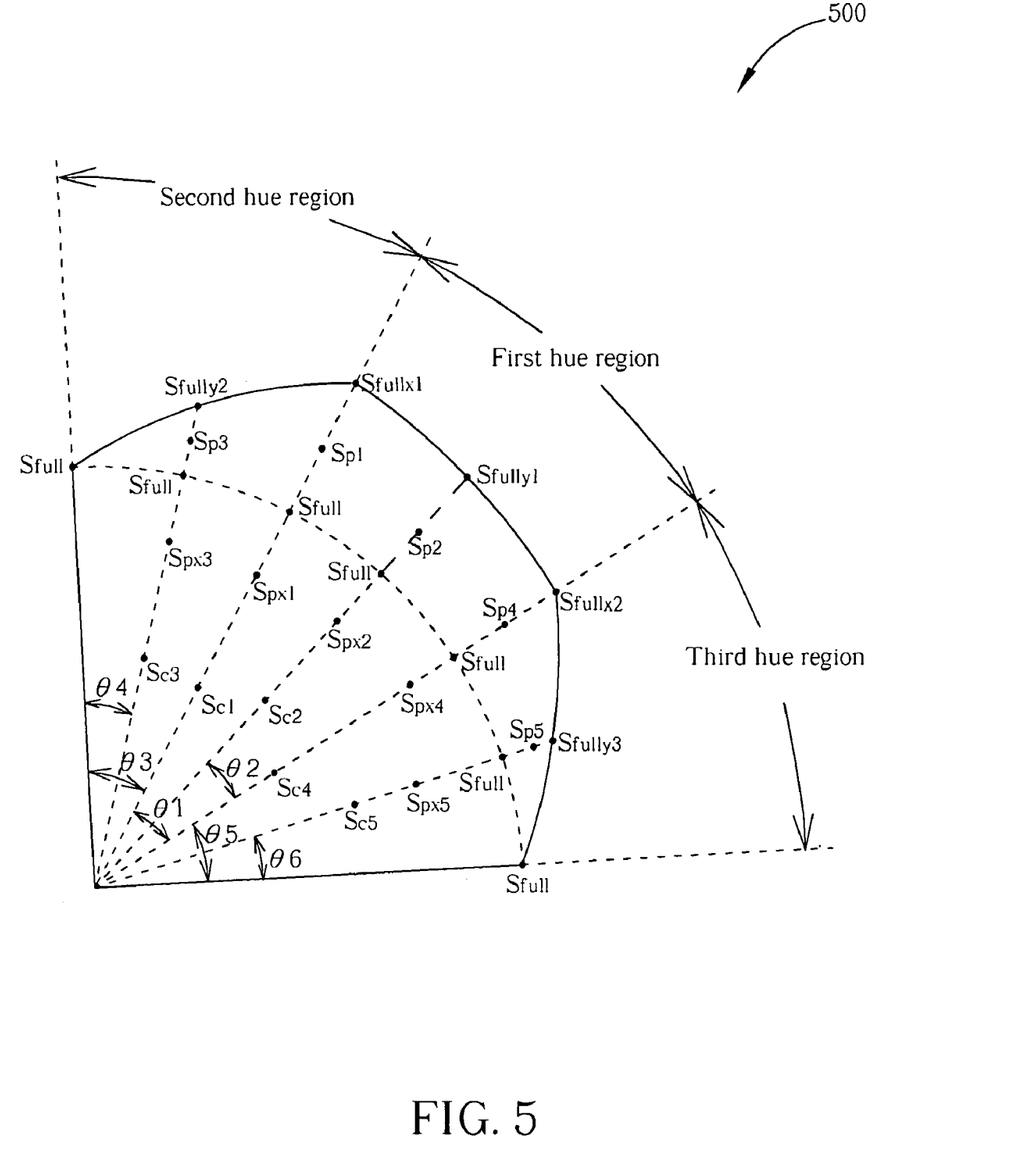
FIG. 5 is a schematic diagram showing parts of a color wheel having over-saturation adjustment on both hue edges of a hue region according to the present invention.
Figure 6:
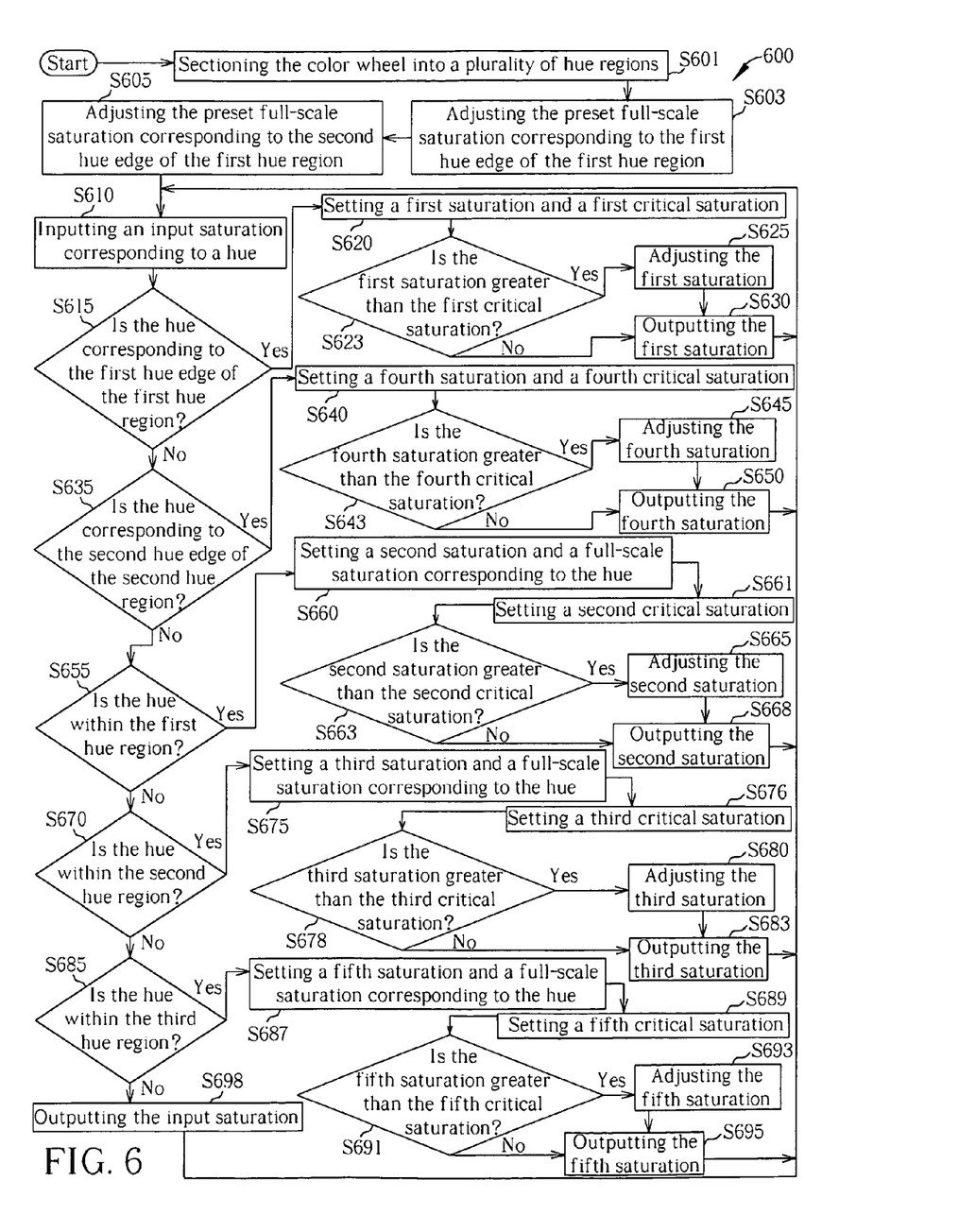
FIG. 6 is a flowchart depicting a saturation adjustment method in accordance with a second embodiment of the present invention.

FIG. 5 is a schematic diagram showing parts of a color wheel 500 having over-saturation adjustment on both hue edges of a hue region according to the present invention. For the sake of clarity, FIG. 5 illustrates only the first hue region, the second hue region and the third hue region of the color wheel 500. Please refer to FIG. 6 in conjunction with the color wheel 500 shown in FIG. 5. FIG. 6 is a flowchart depicting a saturation adjustment method 600 in accordance with a second embodiment of the present invention. The saturation adjustment method 600 comprises the following steps:

Step S601: sectioning the color wheel 500 into a plurality of hue regions comprising the first, second and third hue regions, each hue region having a corresponding preset full-scale saturation $S_{full}$;

Step S603: adjusting the preset full-scale saturation $S_{full}$ corresponding to the first hue edge of the first hue region to become a first full-scale saturation $S_{fullx1}$, wherein the first full-scale saturation $S_{fullx1}$ is greater than the preset full-scale saturation $S_{full}$;

Step S605: adjusting the preset full-scale saturation $S_{full}$ corresponding to the second hue edge of the first hue region to become a second full-scale saturation $S_{fullx2}$, wherein the second full-scale saturation $S_{fullx2}$ is greater than the preset full-scale saturation $S_{full}$;

Step S610: inputting an input saturation corresponding to a hue;

Step S615: determining whether the hue is corresponding to the first hue edge of the first hue region, if the hue is corresponding to the first hue edge of the first hue region, then go to step S620, otherwise go to step S635;

Step S620: setting the input saturation as a first saturation $S_{p1}$, and setting a first critical saturation $S_{c1}$ based on the first full-scale saturation $S_{fullx1}$ according to the formula (12) or (13) listed below:

$$S_{c1} = \frac{S_{full}^2}{S_{fullx1}}\alpha \quad \text{Formula (12)}$$

$$S_{c1} = S_{full} - \frac{S_{full}^2}{S_{fullx1}}\alpha \quad \text{Formula (13)}$$

where $\alpha$ represents a weighted value, the weighted value $\alpha$ is a real number greater than zero;

Step S623: determining whether the first saturation $S_{p1}$ is greater than the first critical saturation $S_{c1}$, if the first saturation $S_{p1}$ is greater than the first critical saturation $S_{c1}$, then go to step S625, otherwise go to step S630;

Step S625: adjusting the first saturation $S_{p1}$ according to the formula (14) listed below:

$$S_{px1} = S_{c1} + (S_{full} - S_{c1})\frac{S_{p1} - S_{c1}}{S_{fullx1} - S_{c1}} \quad \text{Formula (14)}$$

where $S_{px1}$ represents the adjusted first saturation;

Step S630: outputting the first saturation as an output saturation corresponding to the input saturation, go to step S610;

Step S635: determining whether the hue is corresponding to the second hue edge of the first hue region, if the hue is corresponding to the second hue edge of the first hue region, then go to step S640, otherwise go to step S655;

Step S640: setting the input saturation as a fourth saturation $S_{p4}$, and setting a fourth critical saturation $S_{c4}$ based on the second full-scale saturation $S_{fullx2}$ according to the formula (15) or (16) listed below:

$$S_{c4} = \frac{S_{full}^2}{S_{fullx2}} \alpha \qquad \text{Formula (15)}$$

$$S_{c4} = S_{full} - \frac{S_{full}^2}{S_{fullx2}} \alpha; \qquad \text{Formula (16)}$$

Step S643: determining whether the fourth saturation $S_{p4}$ is greater than the fourth critical saturation $S_{c4}$, if the fourth saturation $S_{p4}$ is greater than the fourth critical saturation $S_{c4}$, then go to step S645, otherwise go to step S650;

Step S645: adjusting the fourth saturation $S_{p4}$ according to the formula (17) listed below:

$$S_{px4} = S_{c4} + (S_{full} - S_{c4})\frac{S_{p4} - S_{c4}}{S_{fullx2} - S_{c4}} \qquad \text{Formula (17)}$$

where $S_{px4}$ represents the adjusted fourth saturation;

Step S650: outputting the fourth saturation as an output saturation corresponding to the input saturation, go to step S610;

Step S655: determining whether the hue is within the first hue region, if the hue is within the first hue region, then go to step S660, otherwise go to step S670;

Step S660: setting the input saturation as a second saturation $S_{p2}$, and setting a full-scale saturation $S_{fully1}$ corresponding to the hue based on the first full-scale saturation $S_{fullx1}$ and the second full-scale saturation $S_{fullx2}$ according to the formula (18) listed below:

$$S_{fully1} = S_{fullx2} + \frac{\theta 2}{\theta 1}(S_{fullx1} - S_{fullx2}) \qquad \text{Formula (18)}$$

where $\theta 1$ represents the hue angle included between the first and second hue edges of the first hue region, $\theta 2$ represents the hue angle included between the hue and the second hue edge of the first hue region;

Step S661: setting a second critical saturation $S_{c2}$ based on the full-scale saturation $S_{fully1}$ according to the formula (19) or (20) listed below:

$$S_{c2} = \frac{S_{full}^2}{S_{fully1}} \alpha \qquad \text{Formula (19)}$$

$$S_{c2} = S_{full} - \frac{S_{full}^2}{S_{fully1}} \alpha; \qquad \text{Formula (20)}$$

Step S663: determining whether the second saturation $S_{p2}$ is greater than the second critical saturation $S_{c2}$, if the second saturation $S_{p2}$ is greater than the second critical saturation $S_{c2}$, then go to step S665, otherwise go to step S668;

Step S665: adjusting the second saturation $S_{p2}$ according to the formula (21) listed below:

$$S_{px2} = S_{c2} + (S_{full} - S_{c2})\frac{S_{p2} - S_{c2}}{S_{fully1} - S_{c2}} \qquad \text{Formula (21)}$$

where $S_{px2}$ represents the adjusted second saturation;

Step S668: outputting the second saturation as an output saturation corresponding to the input saturation, go to step S610;

Step S670: determining whether the hue is within the second hue region adjacent to the first hue edge of the first hue region, if the hue is within the second hue region, then go to step S675, otherwise go to step S685;

Step S675: setting the input saturation as a third saturation $S_{p3}$, and setting a full-scale saturation $S_{fully2}$ corresponding to the hue based on the first full-scale saturation $S_{fullx1}$ according to the formula (22) listed below:

$$S_{fully2} = S_{full} + \frac{\theta 4}{\theta 3}(S_{fullx1} - S_{full}) \qquad \text{Formula (22)}$$

where $\theta 3$ represents the hue angle included between the first and second hue edges of the second hue region, $\theta 4$ represents the hue angle included between the hue and the second hue edge of the second hue region, the first hue edge of the second hue region is substantially corresponding to the first hue edge of the first hue region;

Step S676: setting a third critical saturation $S_{c3}$ based on the full-scale saturation $S_{fully2}$ according to the formula (23) or (24) listed below:

$$S_{c3} = \frac{S_{full}^2}{S_{fully2}} \alpha \qquad \text{Formula (23)}$$

$$S_{c3} = S_{full} - \frac{S_{full}^2}{S_{fully2}} \alpha; \qquad \text{Formula (24)}$$

Step S678: determining whether the third saturation $S_{p3}$ is greater than the third critical saturation $S_{c3}$, if the third saturation $S_{p3}$ is greater than the third critical saturation $S_{c3}$, then go to step S680, otherwise go to step S683;

Step S680: adjusting the third saturation $S_{p3}$ according to the formula (25) listed below:

$$S_{px3} = S_{c3} + (S_{full} - S_{c3})\frac{S_{p3} - S_{c3}}{S_{fully2} - S_{c3}} \qquad \text{Formula (25)}$$

where $S_{px3}$ represents the adjusted third saturation;

Step S683: outputting the third saturation as an output saturation corresponding to the input saturation, go to step S610;

Step S685: determining whether the hue is within the third hue region adjacent to the second hue edge of the first hue region, if the hue is within the third hue region, then go to step S687, otherwise go to step S698;

Step S687: setting the input saturation as a fifth saturation $S_{p5}$, and setting a full-scale saturation $S_{fully3}$ corresponding to the hue based on the second full-scale saturation $S_{fullx2}$ according to the formula (26) listed below:

$$S_{fully3} = S_{full} + \frac{\theta 6}{\theta 5}(S_{fullx2} - S_{full}) \qquad \text{Formula (26)}$$

where θ5 represents the hue angle included between the first and second hue edges of the third hue region, θ6 represents the hue angle included between the hue and the second hue edge of the third hue region, the first hue edge of the third hue region is substantially corresponding to the second hue edge of the first hue region;

Step S689: setting a fifth critical saturation $S_{c5}$ based on the full-scale saturation $S_{fully3}$ according to the formula (27) or (28) listed below:

$$S_{c5} = \frac{S_{full}^2}{S_{fully3}}\alpha \qquad \text{Formula (27)}$$

$$S_{c5} = S_{full} - \frac{S_{full}^2}{S_{fully3}}\alpha; \qquad \text{Formula (28)}$$

Step S691: determining whether the fifth saturation $S_{p5}$ is greater than the fifth critical saturation $S_{c5}$, if the fifth saturation $S_{p5}$ is greater than the fifth critical saturation $S_{c5}$, then go to step S693, otherwise go to step S695;

Step S693: adjusting the fifth saturation $S_{p5}$ according to the formula (29) listed below:

$$S_{px5} = S_{c5} + (S_{full} - S_{c5})\frac{S_{p5} - S_{c5}}{S_{fully3} - S_{c5}} \qquad \text{Formula (29)}$$

where $S_{px5}$ represents the adjusted fifth saturation;

Step S695: outputting the fifth saturation as an output saturation corresponding to the input saturation, go to step S610;

Step S698: outputting the input saturation as an output saturation, go to step S610.

In the flow of the saturation adjustment method 600, if the process of step S623 determines that the first saturation $S_{p1}$ is not greater than the first critical saturation $S_{c1}$, then the process of step S630 outputs the unadjusted first saturation $S_{p1}$ as the output saturation corresponding to the input saturation, otherwise the process of step S630 outputs the adjusted first saturation $S_{px1}$ as the output saturation corresponding to the input saturation. If the process of step S643 determines that the fourth saturation $S_{p4}$ is not greater than the fourth critical saturation $S_{c4}$, then the process of step S650 outputs the unadjusted fourth saturation $S_{p4}$ as the output saturation corresponding to the input saturation, otherwise the process of step S650 outputs the adjusted fourth saturation $S_{px4}$ as the output saturation corresponding to the input saturation.

If the process of step S663 determines that the second saturation $S_{p2}$ is not greater than the second critical saturation $S_{c2}$, then the process of step S668 outputs the unadjusted second saturation $S_{p2}$ as the output saturation corresponding to the input saturation, otherwise the process of step S668 outputs the adjusted second saturation $S_{px2}$ as the output saturation corresponding to the input saturation. If the process of step S678 determines that the third saturation $S_{p3}$ is not greater than the third critical saturation $S_{c3}$, then the process of step S683 outputs the unadjusted third saturation $S_{p3}$ as the output saturation corresponding to the input saturation, otherwise the process of step S683 outputs the adjusted third saturation $S_{px3}$ as the output saturation corresponding to the input saturation. If the process of step S691 determines that the fifth saturation $S_{p5}$ is not greater than the fifth critical saturation $S_{c5}$, then the process of step S695 outputs the unadjusted fifth saturation $S_{p5}$ as the output saturation corresponding to the input saturation, otherwise the process of step S695 outputs the adjusted fifth saturation $S_{px5}$ as the output saturation corresponding to the input saturation.

In another embodiment, the saturation adjustment method 900 of the present invention comprises the following steps:

Step S905: adjusting the default full-scale saturation corresponding to a hue of the color wheel to become a regulated full-scale saturation, wherein the regulated full-scale saturation is greater than the default full-scale saturation;

Step S910: setting a critical saturation corresponding to the hue based on the default full-scale saturation and the regulated full-scale saturation according to the formula (30) or (31) listed below:

$$S_c = S_{fulldefault} - \frac{S_{fulldefault}^2}{S_{fullset}}\alpha \qquad \text{Formula (30)}$$

$$S_c = \frac{S_{fulldefault}^2}{S_{fullset}}\alpha \qquad \text{Formula (31)}$$

where $S_c$ represents the critical saturation, $S_{fulldefault}$ represents the default full-scale saturation, $S_{fullset}$ is the regulated full-scale saturation, α represents a weighted value, the weighted value α is a real number greater than zero; and Step S915: adjusting an input saturation within a range between the critical saturation $S_c$ and the regulated full-scale saturation $S_{fullset}$ corresponding to the hue to become an output saturation based on the default full-scale saturation $S_{fulldefault}$, the regulated full-scale saturation $S_{fullset}$ and the critical saturation $S_c$ according to the formula (32) listed below:

$$S_{out} = S_c + (S_{fulldefault} - S_c)\frac{S_{in} - S_c}{S_{fullset} - S_c} \qquad \text{Formula (32)}$$

where $S_{in}$ represents the input saturation, $S_{out}$ represents the output saturation.

In the steps of the saturation adjustment methods 900, 400 and 600, the default full-scale saturation $S_{fulldefault}$ and the preset full-scale saturation $S_{full}$ can be different full-scale saturations standardized in different processes of component manufacturing, product assembling, quality testing, or calibrating, etc., by the manufacturers of displays. Alternately, the default full-scale saturation $S_{fulldefault}$ and the preset full-scale saturation $S_{full}$ can be substantially the same full-scale saturation.

In the aforementioned saturation adjustment methods of the present invention, the related saturations can be normalized by the preset full-scale saturation $S_{full}$ or the default full-scale saturation $S_{fulldefault}$. For instance, the formulas (1) and (2) can be replaced by the formulas (33) and (34) listed below:

$$S_{c1n} = \frac{1}{S_{full \times 1n}}\alpha \qquad \text{Formula (33)}$$

-continued $$S_{c1n} = 1 - \frac{1}{S_{full \times 1n}} \alpha \qquad \text{Formula (34)}$$

where $S_{c1n}$ represents the normalized first critical saturation ($S_{c1}/S_{full}$), $S_{full \times 1n}$ represents the normalized first full-scale saturation ($S_{full \times 1}/S_{full}$). The other formulas can be normalized in the same way.

In summary, the saturation adjustment method of the present invention is capable of adjusting related saturations corresponding to over-saturation adjustment so that the saturation levels over the preset or default full-scale saturation are adjusted to be within the range of the preset or default full-scale saturation without sacrificing the distinguished saturation levels and are available for distinction after the saturation adjustment. Consequently, the image color distortion caused by the over-saturation adjustment can be diminished for improving display quality.

Figure 7:
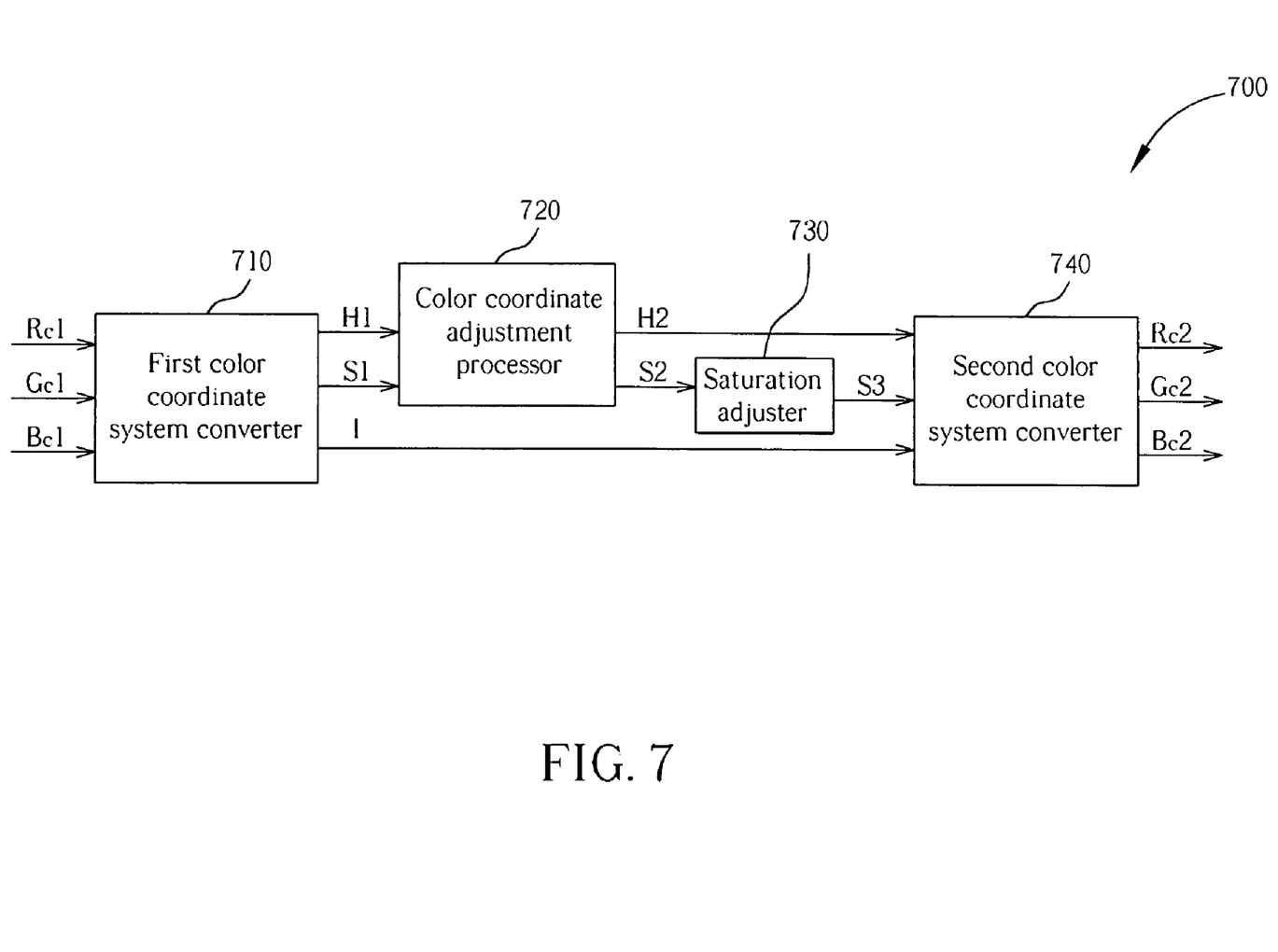
FIG. 7 is a functional block diagram schematically showing a color adjustment system in accordance with an embodiment of the present invention.

Please refer to FIG. 7, which is a functional block diagram schematically showing a color adjustment system 700 in accordance with an embodiment of the present invention. The color adjustment system 700 comprises a first color coordinate system converter 710, a color coordinate adjustment processor 720, a saturation adjuster 730, and a second color coordinate system converter 740. The first color coordinate system converter 710 converts a first red signal Rc1, a first green signal Gc1 and a first blue signal Bc1 into a first hue signal H1, a first saturation signal S1 and a luminance signal I. The color coordinate adjustment processor 720 coupled to the first color coordinate system converter 710 for receiving the first hue signal H1 and the first saturation signal S1. The color coordinate adjustment processor 720 stores a look-up table (LUT). The look-up table is utilized for mapping the first hue signal H1 and the first saturation signal S1 to a corresponding hue region of a plurality of hue regions in a sectioned color wheel for generating a second hue signal H2 and a second saturation signal S2. Furthermore, the color coordinate adjustment processor 720 is capable of adjusting a plurality of full-scale saturations corresponding to a plurality of hue edges of the hue regions in the sectioned color wheel.

The saturation adjuster 730 is coupled to the color coordinate adjustment processor 720 for receiving the second saturation signal S2. The saturation adjuster 730 adjusts the second saturation signal S2 to become a third saturation signal S3 based on at least one full-scale saturation and a corresponding critical saturation. In one embodiment, if the second saturation S2 is greater than the critical saturation, then the saturation adjuster 730 adjusts the second saturation signal S2 to become the third saturation signal S3 based on the at least one full-scale saturation and the critical saturation, otherwise the second saturation signal S2 is forwarded to directly become the third saturation signal S3. The second color coordinate system converter 740 is coupled to the first color coordinate system converter 710, the color coordinate adjustment processor 720 and the saturation adjuster 730 for receiving the luminance signal I, the second hue signal H2 and the third saturation signal S3 respectively. The second color coordinate system converter 740 converts the luminance signal I, the second hue signal H2 and the third saturation signal S3 into a second red signal Rc2, a second green signal Gc2 and a second blue signal Bc2.

The saturation adjuster 730 of the color adjustment system 700 may adjust related saturations to be within the range of the preset or default full-scale saturation without sacrificing the saturation levels based on the saturation adjustment method 400, 600 or 900 when over-saturation adjustment occurs to the preset or default full-scale saturation. That is, the color adjustment system 700 is capable of diminishing the image color distortion caused by the over-saturation adjustment for improving display quality.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A saturation adjustment method comprising:
   sectioning a color wheel into a plurality of hue regions, each hue region having a corresponding preset full-scale saturation;
   adjusting the preset full-scale saturation corresponding to a first hue edge of a first hue region of the hue regions to become a first full-scale saturation, wherein the first full-scale saturation is greater than the preset full-scale saturation;
   setting a first critical saturation corresponding to the first hue edge of the first hue region based on the first full-scale saturation and the preset full-scale saturation; and
   adjusting a first saturation within a range between the first critical saturation and the first full-scale saturation corresponding to the first hue edge of the first hue region based on the preset full-scale saturation, the first full-scale saturation and the first critical saturation.

2. The saturation adjustment method of claim 1, wherein setting the first critical saturation corresponding to the first hue edge of the first hue region based on the first full-scale saturation and the preset full-scale saturation is setting the first critical saturation according to the following formula:

$$S_{c1} = S_{full} - \frac{S_{full}^2}{S_{full \times 1}} \alpha \text{ or } S_{c1} = \frac{S_{full}^2}{S_{full \times 1}} \alpha$$

where $S_{c1}$ represents the first critical saturation, $S_{full}$ represents the preset full-scale saturation, $S_{full \times 1}$ represents the first full-scale saturation, $\alpha$ represents a weighted value, and the weighted value $\alpha$ is a real number greater than zero.

3. The saturation adjustment method of claim 1, wherein adjusting the first saturation within the range between the first critical saturation and the first full-scale saturation corresponding to the first hue edge of the first hue region based on the preset full-scale saturation, the first full-scale saturation and the first critical saturation is adjusting the first saturation according to the following formula:

$$S_{p \times 1} = S_{c1} + (S_{full} - S_{c1}) \frac{S_{p1} - S_{c1}}{S_{full \times 1} - S_{c1}}$$

where $S_{full}$ represents the preset full-scale saturation, $S_{full \times 1}$ represents the first full-scale saturation, $S_{c1}$ represents the first critical saturation, $S_{p1}$ represents the unadjusted first saturation, and $S_{p \times 1}$ represents the adjusted first saturation.

4. The saturation adjustment method of claim 1, further comprising:
adjusting the preset full-scale saturation corresponding to a hue between the first hue edge and a second hue edge of the first hue region to become a second full-scale saturation based on the first full-scale saturation; and
setting a second critical saturation corresponding to the hue based on the second full-scale saturation and the preset full-scale saturation.

5. The saturation adjustment method of claim 4, wherein adjusting the preset full-scale saturation corresponding to the hue between the first hue edge and the second hue edge of the first hue region to become the second full-scale saturation based on the first full-scale saturation is adjusting the preset full-scale saturation to become the second full-scale saturation according to the following formula:

$$S_{full\times 2} = S_{full} + \frac{\theta 2}{\theta 1}(S_{full\times 1} - S_{full})$$

where $S_{full}$ represents the preset full-scale saturation, $S_{full\times 1}$ represents the first full-scale saturation, $\theta 1$ represents a hue angle included between the first and second hue edges of the first hue region, $\theta 2$ represents a hue angle included between the hue and the second hue edge of the first hue region, and $S_{full\times 2}$ represents the second full-scale saturation.

6. The saturation adjustment method of claim 4, wherein setting the second critical saturation corresponding to the hue based on the second full-scale saturation and the preset full-scale saturation is setting the second critical saturation according to the following formula:

$$S_{c2} = S_{full} - \frac{S_{full}^2}{S_{full\times 2}}\alpha \text{ or } S_{c2} = \frac{S_{full}^2}{S_{full\times 2}}\alpha$$

where $S_{c2}$ represents the second critical saturation, $S_{full}$ represents the preset full-scale saturation, $S_{full\times 2}$ represents the second full-scale saturation, $\alpha$ represents a weighted value, and the weighted value $\alpha$ is a real number greater than zero.

7. The saturation adjustment method of claim 4, further comprising:
adjusting a second saturation within a range between the second critical saturation and the second full-scale saturation corresponding to the hue based on the preset full-scale saturation, the second full-scale saturation and the second critical saturation according to the following formula:

$$S_{p\times 2} = S_{c2} + (S_{full} - S_{c2})\frac{S_{p2} - S_{c2}}{S_{full\times 2} - S_{c2}}$$

where $S_{full}$ represents the preset full-scale saturation, $S_{full\times 2}$ represents the second full-scale saturation, $S_{c2}$ represents the second critical saturation, $S_{p2}$ represents the unadjusted second saturation, and $S_{p\times 2}$ represents the adjusted second saturation.

8. The saturation adjustment method of claim 1, further comprising:
adjusting the preset full-scale saturation corresponding to a hue between a first hue edge and a second hue edge of a second hue region to become a third full-scale saturation based on the first full-scale saturation; and
setting a third critical saturation corresponding to the hue based on the third full-scale saturation and the preset full-scale saturation;
wherein the first hue edge of the second hue region is substantially corresponding to the first hue edge of the first hue region.

9. The saturation adjustment method of claim 8, wherein adjusting the preset full-scale saturation corresponding to the hue between the first hue edge and the second hue edge of the second hue region to become the third full-scale saturation based on the first full-scale saturation is adjusting the preset full-scale saturation to become the third full-scale saturation according to the following formula:

$$S_{full\times 3} = S_{full} + \frac{\theta 4}{\theta 3}(S_{full\times 1} - S_{full})$$

where $S_{full}$ represents the preset full-scale saturation, $S_{full\times 1}$ represents the first full-scale saturation, $\theta 3$ represents a hue angle included between the first and second hue edges of the second hue region, $\theta 4$ represents a hue angle included between the hue and the second hue edge of the second hue region, and $S_{full\times 3}$ represents the third full-scale saturation.

10. The saturation adjustment method of claim 8, wherein setting the third critical saturation corresponding to the hue based on the third full-scale saturation and the preset full-scale saturation is setting the third critical saturation according to the following formula:

$$S_{c3} = S_{full} - \frac{S_{full}^2}{S_{full\times 3}}\alpha \text{ or } S_{c3} = \frac{S_{full}^2}{S_{full\times 3}}\alpha$$

where $S_{c3}$ represents the third critical saturation, $S_{full}$ represents the preset full-scale saturation, $S_{full\times 3}$ represents the third full-scale saturation, $\alpha$ represents a weighted value, and the weighted value $\alpha$ is a real number greater than zero.

11. The saturation adjustment method of claim 8, further comprising:
adjusting a third saturation within a range between the third critical saturation and the third full-scale saturation corresponding to the hue based on the preset full-scale saturation, the third full-scale saturation and the third critical saturation according to the following formula:

$$S_{p\times 3} = S_{c3} + (S_{full} - S_{c3})\frac{S_{p3} - S_{c3}}{S_{full\times 3} - S_{c3}}$$

where $S_{full}$ represents the preset full-scale saturation, $S_{full\times 3}$ represents the third full-scale saturation, $S_{c3}$ represents the third critical saturation, $S_{p3}$ represents the unadjusted third saturation, and $S_{p\times 3}$ represents the adjusted third saturation.

12. The saturation adjustment method of claim 1, further comprising:
adjusting the preset full-scale saturation corresponding to a second hue edge of the first hue region to become a second full-scale saturation;

adjusting the preset full-scale saturation corresponding to a hue between the first hue edge and the second hue edge of the second hue region to become a third full-scale saturation based on the first full-scale saturation and the second full-scale saturation; and setting a second critical saturation corresponding to the hue based on the third full-scale saturation and the preset full-scale saturation.

13. The saturation adjustment method of claim 12, wherein adjusting the preset full-scale saturation corresponding to the hue between the first hue edge and the second hue edge of the second hue region to become the third full-scale saturation based on the first full-scale saturation and the second full-scale saturation is adjusting the preset full-scale saturation to become the third full-scale saturation according to the following formula:

$$S_{full \times 3} = S_{full \times 2} + \frac{\theta 2}{\theta 1}(S_{full \times 1} - S_{full \times 2})$$

where $S_{full \times 1}$ represents the first full-scale saturation, $S_{full \times 2}$ represents the second full-scale saturation, $\theta 1$ represents a hue angle included between the first and second hue edges of the first hue region, $\theta 2$ represents a hue angle included between the hue and the second hue edge of the first hue region, and $S_{full \times 3}$ represents the third full-scale saturation.

14. The saturation adjustment method of claim 12, wherein setting the second critical saturation corresponding to the hue based on the third full-scale saturation and the preset full-scale saturation is setting the second critical saturation according to the following formula:

$$S_{c2} = S_{full} - \frac{S_{full}^2}{S_{full \times 3}}\alpha \text{ or } S_{c2} = \frac{S_{full}^2}{S_{full \times 3}}\alpha$$

where $S_{c2}$ represents the second critical saturation, $S_{full}$ represents the preset full-scale saturation, $S_{full \times 3}$ represents the third full-scale saturation, $\alpha$ represents a weighted value, and the weighted value $\alpha$ is a real number greater than zero.

15. The saturation adjustment method of claim 12, further comprising:

adjusting a second saturation within a range between the second critical saturation and the third full-scale saturation corresponding to the hue based on the preset full-scale saturation, the third full-scale saturation and the second critical saturation according to the following formula:

$$S_{p \times 2} = S_{c2} + (S_{full} - S_{c2})\frac{S_{p2} - S_{c2}}{S_{full \times 3} - S_{c2}}$$

where $S_{full}$ represents the preset full-scale saturation, $S_{full \times 3}$ represents the third full-scale saturation, $S_{c2}$ represents the second critical saturation, $S_{p2}$ represents the unadjusted second saturation, and $S_{p \times 2}$ represents the adjusted second saturation.

16. A saturation adjustment method comprising:
adjusting a default full-scale saturation corresponding to a hue of a color wheel to become a regulated full-scale saturation, wherein the regulated full-scale saturation is greater than the default full-scale saturation;

setting a critical saturation corresponding to the hue based on the default full-scale saturation and the regulated full-scale saturation; and adjusting an input saturation within a range between the critical saturation and the regulated full-scale saturation corresponding to the hue to become an output saturation based on the default full-scale saturation, the regulated full-scale saturation and the critical saturation.

17. The saturation adjustment method of claim 16, wherein setting the critical saturation corresponding to the hue based on the default full-scale saturation and the regulated full-scale saturation is setting the critical saturation according to the following formula:

$$S_c = S_{fulldefault} - \frac{S_{fulldefault}^2}{S_{fullset}}\alpha \text{ or } S_c = \frac{S_{fulldefault}^2}{S_{fullset}}\alpha$$

where $S_c$ represents the critical saturation, $S_{fulldefault}$ represents the default full-scale saturation, $S_{fullset}$ represents the regulated full-scale saturation, $\alpha$ represents a weighted value, and the weighted value $\alpha$ is a real number greater than zero.

18. The saturation adjustment method of claim 16, wherein adjusting the input saturation within the range between the critical saturation and the regulated full-scale saturation corresponding to the hue to become the output saturation based on the default full-scale saturation, the regulated full-scale saturation and the critical saturation is adjusting the input saturation to become the output saturation according to the following formula:

$$S_{out} = S_c + (S_{fulldefault} - S_c)\frac{S_{in} - S_c}{S_{fullset} - S_c}$$

where $S_{fulldefault}$ represents the default full-scale saturation, $S_{fullset}$ represents the regulated full-scale saturation, $S_c$ represents the critical saturation, $S_{in}$ represents the input saturation, and $S_{out}$ represents the output saturation.

19. A color adjustment system comprising:
a first color coordinate system converter for converting a first red signal, a first green signal and a first blue signal into a first hue signal, a first saturation signal and a luminance signal;

a color coordinate adjustment processor coupled to the first color coordinate system converter for receiving the first hue signal and the first saturation signal, the color coordinate adjustment processor storing a look-up table (LUT) for mapping the first hue signal and the first saturation signal to a corresponding hue region of a plurality of hue regions in a sectioned color wheel for generating a second hue signal and a second saturation signal, wherein a plurality of full-scale saturations corresponding to a plurality of hue edges of the hue regions are adjustable;

a saturation adjuster coupled to the color coordinate adjustment processor for receiving the second saturation signal, the saturation adjuster adjusting the second saturation signal to become a third saturation signal based on at least one full-scale saturation and a critical saturation; and a second color coordinate system converter coupled to the first color coordinate system converter, the color coordinate adjustment processor and the saturation adjuster for receiving the luminance signal, the second hue signal and the third saturation signal respectively, the second color coordinate system converter converting the luminance signal, the second hue signal and the third saturation signal into a second red signal, a second green signal and a second blue signal.

20. The color adjustment system of claim 19, wherein the saturation adjuster adjusts the second saturation signal to become the third saturation signal based on at least one full-scale saturation and the critical saturation when the second saturation signal is greater than the critical saturation.

* * * * *